A. KNEPPER.
LAND AND WATER ENGINE.
APPLICATION FILED MAY 25, 1920.

1,357,571.

Patented Nov. 2, 1920.
2 SHEETS—SHEET 1.

Inventor
Asher Knepper,
By Samuel Herrick, Attorney

A. KNEPPER.
LAND AND WATER ENGINE.
APPLICATION FILED MAY 25, 1920.

1,357,571.

Patented Nov. 2, 1920.
2 SHEETS—SHEET 2.

Asher Knepper, Inventor,
By Samuel Herrick,
Attorney

UNITED STATES PATENT OFFICE.

ASHER KNEPPER, OF REDFIELD, SOUTH DAKOTA.

LAND AND WATER ENGINE.

1,357,571.　　　　Specification of Letters Patent.　　Patented Nov. 2, 1920.

Application filed May 25, 1920. Serial No. 384,220.

*To all whom it may concern:*

Be it known that I, ASHER KNEPPER, a citizen of the United States of America, residing at Redfield, in the county of Spink and State of South Dakota, have invented certain new and useful Improvements in Land and Water Engines, of which the following is a specification.

This invention relates to a land and water engine and it has for its object to provide a novel structure adapted to travel with great speed upon the land or water and having many uses in the pursuits of both war and peace. The device is adapted to be used as a so called "tank" in warfare, as a tractor or as a conveyance upon land and is susceptible of ready modification to adapt it to travel upon water.

Further objects and advantages of the invention will be set forth in the detailed description which now follows:

In the accompanying drawing.

Like numerals designate corresponding parts throughout the several figures of the drawing.

Figure 1:
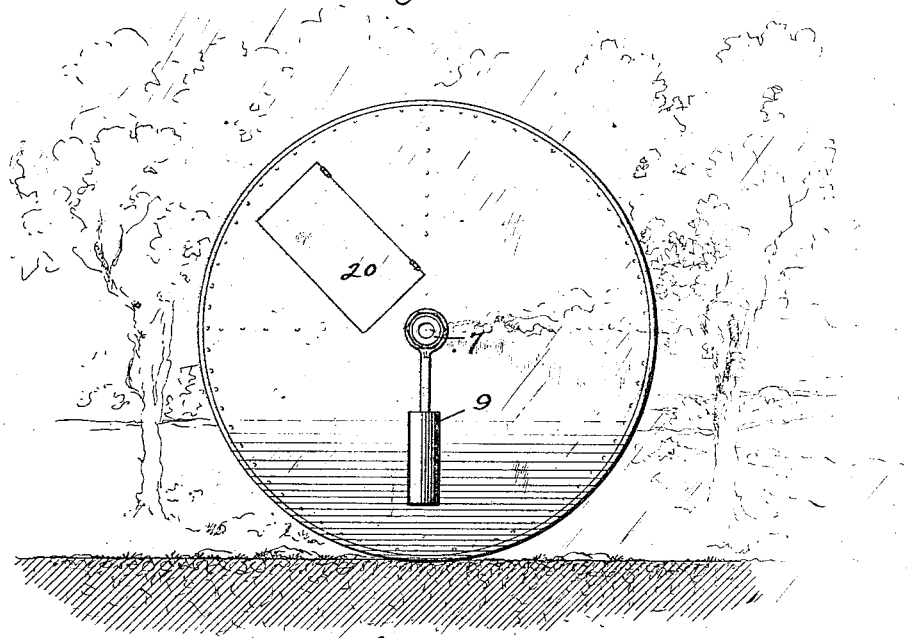
Figure 1 is a side elevation of one form of the invention adapted to travel upon the land.
Figure 2:
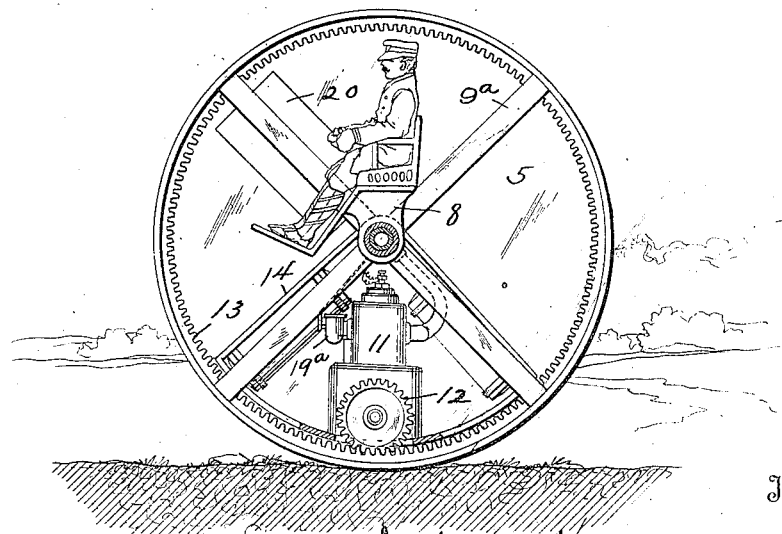
Fig. 2 is an inner face view of one-half of the structure.
Figure 3:
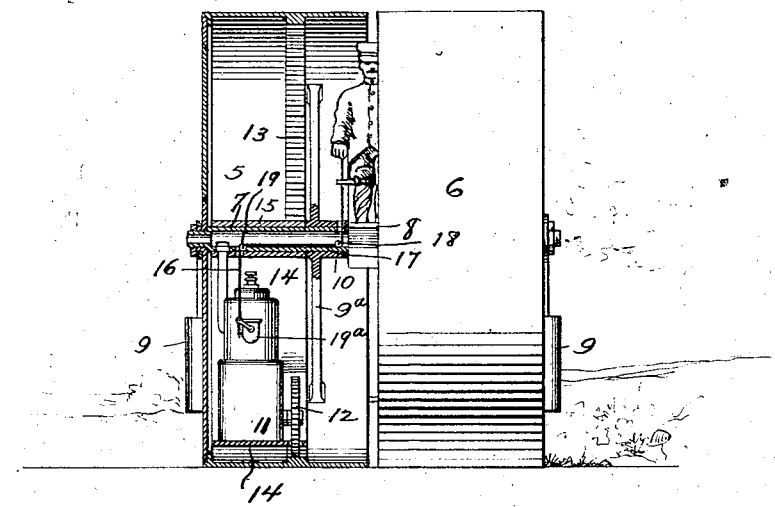
Fig. 3 is a view partly in front elevation and partly in section.

Referring to the drawing it will be seen that the invention comprises a pair of cylinders 5 and 6, adapted for bodily rotation, it being intended that during the forward travel of the machine, these two cylindrical members will rotate in unison and at substantially the same rate of speed and that the machine, as a whole, will roll bodily along the ground. The cylinders 5 and 6 are mounted to rotate about a fixed axle 7, upon which a driver's seat may be supported at a point between the cylinders as indicated at 8. In order to hold the shaft 7 against rotation and to keep the driver's seat in an upright position, counterweights 9, are secured to the outer ends of the shaft 7 and are of such weight as to counterbalance the weight of the seat and driver. The drums or cylinders 5 and 6 are provided with spokes 9ª, these spokes in turn being connected to a hub 10 which has a bearing upon the shaft 7. Each of the cylinders 5 and 6 is provided with an independent propelling engine. Since the internal construction of each cylinder is identical, with that of the other, a description of one will serve as a description of both. By referring to Figs. 2 and 3 it will be seen that the propelling means for these cylinders comprise engines 11, which are preferably gasolene engines. These engines drive gear wheels 12, which mesh with internal racks 13 formed upon the cylinders 5 and 6. The engines are mounted for oscillatory movement by being supported in swinging frames 14 which are hung upon the shaft 7.

It will thus be seen that when the engines are started the frames 14, the engines and all of the parts associated therewith tend to ride up the racks 13. As soon as they have moved forward far enough for the weight of the engine and associated parts to exert a turning movement upon the drums or cylinders 5 and 6, the machine as a whole will begin to move.

The machine may be effectively steered by the driver manipulating the controls of the engines in such manner that one engine is caused to travel faster than the other, and if occasion should demand one engine may be reversed while the other is caused to travel ahead. This will cause the machine as a whole to spin about in its tracks.

Any desired means may be provided for controlling the engines from the operator's seat. As a conventional means of accomplishing this object, I have illustrated a wire 16, which passes through a slot 17 formed in the shaft 7 and passes over fixed pins or rollers 18 and 19. It is common practice in gasolene engine controls, to have the throttle valve, spring actuated, in one direction. Therefore a pull upon the wire 16 will open the throttle valve and when the wire is released the throttle will close.

While I have illustrated the wire 16 as leading to the carbureter 19ª, it is manifest that this element 19ª could be the timer so that control of the engine could be effected by varying the time of the spark in the usual and well known way.

Figure 4:
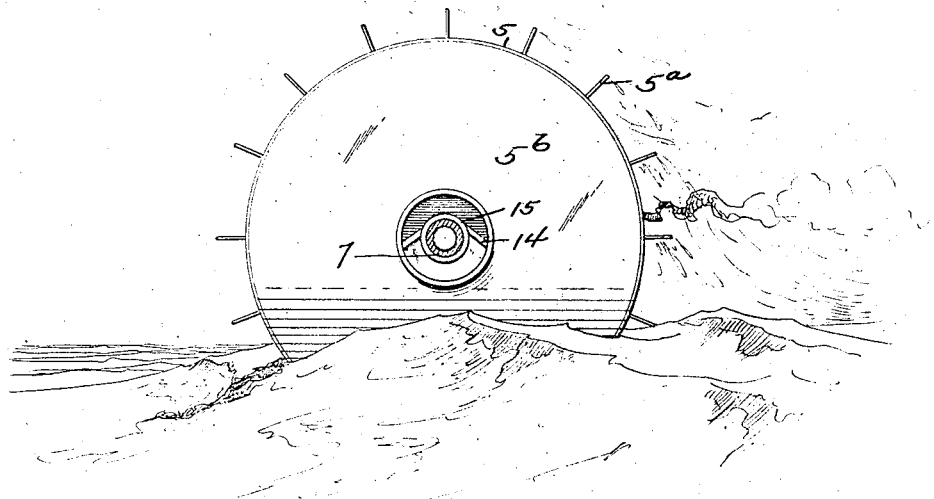
Fig. 4 is a side elevation of a form of the invention adapted to travel upon the water.

I have illustrated a door 20, as providing means of ingress to the machine. In the form of the invention illustrated in Fig. 4 blades or paddles 5ª are applied to the peripheries of the cylinders and the inner sides of said cylinders are closed to a point above the water line by walls 5ᵇ, whereby the structure is rendered sufficiently buoyant to adapt the device for use upon water.

It is to be understood that the invention is not limited to the precise construction set forth but that it includes within its purview whatever changes fairly come within either the terms or the spirit of the appended claims.

Having described my invention, what I claim is—

1. A device of the character described comprising two independently rotatable cylinders, a fixed axle about which said cylinders rotate, a driver's seat supported upon said fixed axle, counterbalancing means for said driver's seat, an individual motor for each of the cylinders mounted in the interior of said cylinders, an internal rack upon each cylinder, gearings driven by the motor and meshing with said racks and means for mounting said motors to oscillate about the axis of rotation of the cylinders.

2. In a device of the character described the combination with a fixed axle, a driver's seat supported thereon, counterbalancing weights carried by said axle to hold it against rotation, a pair of cylinders mounted for independent rotation upon said axle, an internal gear carried by each of said cylinders, a swinging frame mounted upon the axle within each of the cylinders, a motor carried by each swinging frame, gearing driven by the motor and meshing with the rack and an independent controlling means for each of said motors accessible from the driver's seat.

In testimony whereof I affix my signature in the presence of two witnesses.

ASHER KNEPPER.

Witnesses:
  W. F. BRUELL,
  GERTINE L. ERICKSON.